US007925793B2

(12) United States Patent
Rittmeyer et al.

(10) Patent No.: US 7,925,793 B2
(45) Date of Patent: Apr. 12, 2011

(54) RECONFIGURABLE TEST SYSTEM

(75) Inventors: Bryan Rittmeyer, Sherman Oaks, CA (US); Alon Regev, Woodland Hills, CA (US); Gerald R. Pepper, Thousand Oaks, CA (US); Errol Ginsberg, Malibu, CA (US)

(73) Assignee: Ixia, Calabasas, CA (US)

( * ) Notice: Subject to any disclaimer, the term of this patent is extended or adjusted under 35 U.S.C. 154(b) by 656 days.

(21) Appl. No.: 11/756,470

(22) Filed: May 31, 2007

(65) Prior Publication Data
US 2008/0298261 A1    Dec. 4, 2008

(51) Int. Cl.
H04L 1/00        (2006.01)
H04L 12/26       (2006.01)
G06F 15/16       (2006.01)
G06F 15/173      (2006.01)

(52) U.S. Cl. ........ 709/249; 370/242; 370/244; 370/245; 370/248; 370/229; 709/235; 709/239

(58) Field of Classification Search .................. 709/235, 709/201, 223, 224, 249; 370/229, 242, 392, 370/463, 216–220, 244, 245, 248, 250
See application file for complete search history.

(56) References Cited

U.S. PATENT DOCUMENTS

| | | | | |
|---|---|---|---|---|
| 5,198,808 A * | 3/1993 | Kudo | ............................ | 340/2.22 |
| 5,720,032 A * | 2/1998 | Picazo et al. | .................... | 709/250 |
| 5,812,646 A * | 9/1998 | Kikuchi | .................... | 379/100.16 |
| 5,949,789 A * | 9/1999 | Davis et al. | .................... | 370/452 |
| 6,028,847 A | 2/2000 | Beanland | | |
| 6,212,258 B1 * | 4/2001 | Bella et al. | ................. | 379/29.01 |
| 6,243,510 B1 * | 6/2001 | Rauch | ............................. | 385/15 |
| 6,262,993 B1 * | 7/2001 | Kirmse | ........................ | 370/463 |
| 6,282,169 B1 * | 8/2001 | Kiremidjian | .................. | 370/220 |
| 6,532,215 B1 * | 3/2003 | Muntz | ............................ | 370/242 |
| 6,542,928 B1 * | 4/2003 | Hammons | ..................... | 709/221 |
| 6,950,405 B2 | 9/2005 | Van Gerrevink | | |
| 7,103,322 B2 * | 9/2006 | Jones et al. | .................. | 455/90.3 |
| 7,269,697 B1 * | 9/2007 | Reeve et al. | .................. | 711/148 |
| 7,606,153 B2 * | 10/2009 | Nakaya et al. | ................ | 370/231 |
| 7,724,668 B2 * | 5/2010 | Bitar | ............................ | 370/235 |
| 2004/0165590 A1 * | 8/2004 | Reiner et al. | .................. | 370/392 |
| 2004/0236866 A1 * | 11/2004 | Dugatkin et al. | ............. | 709/235 |
| 2005/0044137 A1 * | 2/2005 | Dubreuil | ...................... | 709/201 |
| 2005/0232159 A1 * | 10/2005 | Joo et al. | ....................... | 370/241 |
| 2006/0203715 A1 * | 9/2006 | Hunter et al. | ................. | 370/216 |
| 2007/0011370 A1 * | 1/2007 | Venkata et al. | ................ | 710/62 |
| 2008/0165610 A1 * | 7/2008 | Kim et al. | ................... | 365/233.1 |
| 2008/0165678 A1 * | 7/2008 | Trinh et al. | .................... | 370/229 |

* cited by examiner

*Primary Examiner* — Joseph E Avellino
*Assistant Examiner* — Aftab Nasir Khan
(74) *Attorney, Agent, or Firm* — SoCal IP Law Group LLP; Steven C. Sereboff; John E. Gunther

(57) ABSTRACT

There is disclosed a reconfigurable network test system. The reconfigurable test system may include a plurality of test modules, a plurality of network interface units, a plurality of bypass units, and a multi-port switch. Each of the network interface units may have a first end and a second end adapted to be connected to a network. Each bypass unit may be in communication with an associated test module, the first end of an associated network interface unit, a first associated switch port, and a second associated switch port. Each bypass unit may have a first mode wherein the associated test module is placed in communication with the first end of the associated network interface unit, and a second mode wherein the associated test module is placed in communication with the first associated switch port and the associated network interface unit is placed in communication with the second associated switch.

14 Claims, 7 Drawing Sheets

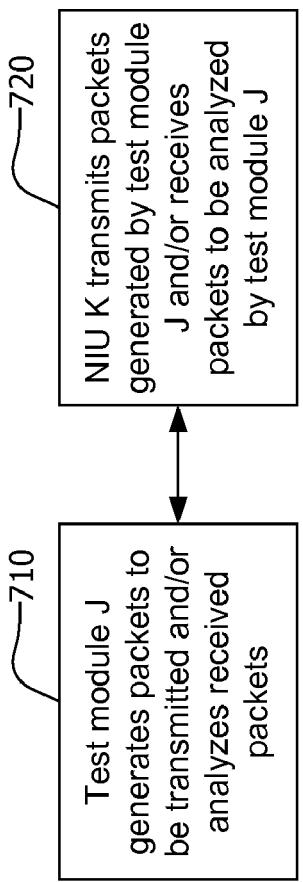

FIG. 7A

710 — Test module J generates packets to be transmitted and/or analyzes received packets 720 — NIU K transmits packets generated by test module J and/or receives packets to be analyzed by test module J

FIG. 7B

730 — Multiple test modules generate packets to be transmitted and/or analyze received packets 740 — The packet switch aggregates packets to be transmitted and de-aggregates received packets 750 — A selected NIU transmits packets aggregated by the switch and/or receives packets to be de-aggregated by the switch

FIG. 7C

760 — A plurality of test modules generate packets to be transmitted and/or analyze received packets 770 — The packet switch aggregates packets to be transmitted and de-aggregates received packets 780 — The high speed pipe transmits packets aggregated by the switch and/or receives packets to be de-aggregated by the switch

RECONFIGURABLE TEST SYSTEM

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating and analyzing traffic for testing a network or network device.

2. Description of the Related Art

In many types of communications networks, each message to be sent is divided into portions of fixed or variable length. These portions may be referred to as packets, frames, cells, datagrams, or data units, all of which are referred to herein as packets. Communications networks that transmit messages as packets are called packet switched networks.

Each packet contains a portion of the original message, commonly called the body of the packet. The body of a packet may contain data, or may contain voice or video information. The body of a packet may also contain network management and control information. In addition, each packet contains identification and routing information, commonly called a packet header. The packets are then sent individually over the network through multiple switches or nodes and then reassembled at a final destination using the information contained in the packet headers, before being delivered to a target device or end user. At the receiving end, the reassembled message is passed to the end user in a format compatible with the user's equipment.

Most packet switched networks operate according to a set of established protocols, implemented in a collection of interfaced layers known as a protocol stack. These layers may be defined according to the Open Systems Interconnect (OSI) model, having seven layers (from top to bottom): application, presentation, session, transport, network, data-link and physical.

All but the physical layer of a protocol stack are typically software, though the network and data-link layer may be firmware and/or hardware. Each layer of the protocol stack typically exists to perform a specific function, such as addressing, routing, framing and physical transmission of packets. When a packet is to be transmitted over a network from a source system to a destination system, the packet will pass in a logically downward direction through layers of the protocol stack on the source system, and in a logically upward direction through corresponding layers of the protocol stack on the destination system. Each layer passes the packet to the adjacent layer, either up or down the protocol stack depending on whether the packet has been received or is being transmitted.

Each layer of the protocol stack in the transmitting process may add a respective header to the packet, which provides information to the corresponding layer in a receiving process. Thus, as a packet passes down through the protocol stack on a transmitting system, the packet may gain an additional header at each layer. At the bottom of the stack, the transmitting process may then frame the packet and physically transmit it over the network toward its destination. When the packet reaches its destination, the packet will then pass up through the protocol stack of the destination system. Each layer of the protocol stack in the destination system may obtain useful information from its associated header and will strip its header from the packet before passing the packet up to the next layer for processing.

One or more layers of the protocol stack in the transmitting process may partition or fragment a packet into multiple packets of shorter length before passing the packets to the next lower layer in the stack. When the packet fragments reach their destination, the original packet will be reassembled as the fragments pass up through the protocol stack of the destination system.

A variety of standards are known for use in packet switched networks. One of the best known of these, the TCP/IP suite, is typically used to manage reliable transmission of packets throughout the Internet and other IP networks. The TCP/IP standard defines five layers: physical, link, network (IP), transport (TCP) and application. These layers correspond to layers 1, 2, 3, 4 and 7 of the OSI model respectively. Common practice, however, is to describe layers 1, 2, 3, and 4 as the TCP/IP stack, and to view the application layer as lying on top of the stack.

The transport layer of TCP/IP corresponds to layer 4 of the OSI model. The transport layer allows source and destination machines to carry on a reliable conversation with each other. A second commonly-used transport layer protocol is the UDP (User Datagram Protocol). Unlike TCP, UDP provides no error recovery or reliability mechanisms. Because of this simplicity, UDP packets have shorter headers than TCP packets, and thus consume fewer system resources. Among other applications, UDP may be used to transmit real-time audio or video content.

The IP layer in TCP/IP or UDP/IP corresponds to the network layer of the OSI model. The IP layer provides addressing information to facilitate independent routing of packets within or between networks.

The link layer under TCP/IP or UDP/IP corresponds to the data-link layer of the OSI model. The link layer includes network interface card drivers to connect the machine to the physical network, such as an Ethernet network.

In general, the machines that implement the TCP/IP protocol stack are computers. Each of these computers includes one or more processors, memories, and input/output ports, and is managed by an operating system.

The computer memory may include a user space and a kernel space. The kernel space is an area of memory which is strictly reserved for running the kernel, device drivers and any kernel extensions. The TCP/IP protocol stack typically resides in kernel space, and higher level protocols such as HTTP, RTP, and RTCP typically reside in user space. Though some portions of the kernel space may be swapped (paged) out to the disk, some portions are typically never swappable. The user space is a memory area used by all applications and this memory can typically be swapped out at any time depending upon the current system requirements. The user space and the kernel space are distinct. An application program usually cannot access the kernel space directly. Application programs may, however, use the kernel to access system resources and hardware through system calls, and are therefore thought of as running above, or on top of, the kernel.

Typically, when an incoming packet enters a computer or other hardware device running a protocol stack, the destination of the packet may be some specific code within the kernel, or it may be an application program. In any event, the packet will typically be processed by multiple layers of the protocol stack and finally arrive at its destination. Similarly, an outgoing packet will typically be processed by multiple layers of the protocol stack before being transmitted onto the network. In some cases, a packet may pass through one or more layers of the protocol stack multiple times before being transmitted onto the network, or before being passed on to its destination. At any instant in time, multiple packets may be in process or held at any or all of the layers of the protocol stack.

DESCRIPTION OF THE DRAWINGS

FIG. 7A is a flow chart of a first mode of operating a test system.

FIG. 7B is a flow chart of a second mode of operating a test system.

FIG. 7C is a flow chart of a third mode of operating a test system.

DETAILED DESCRIPTION

Throughout this description, the embodiments and examples shown should be considered as exemplars, rather than limitations on the apparatus and methods disclosed or claimed.

Description of Apparatus

Figure 1:
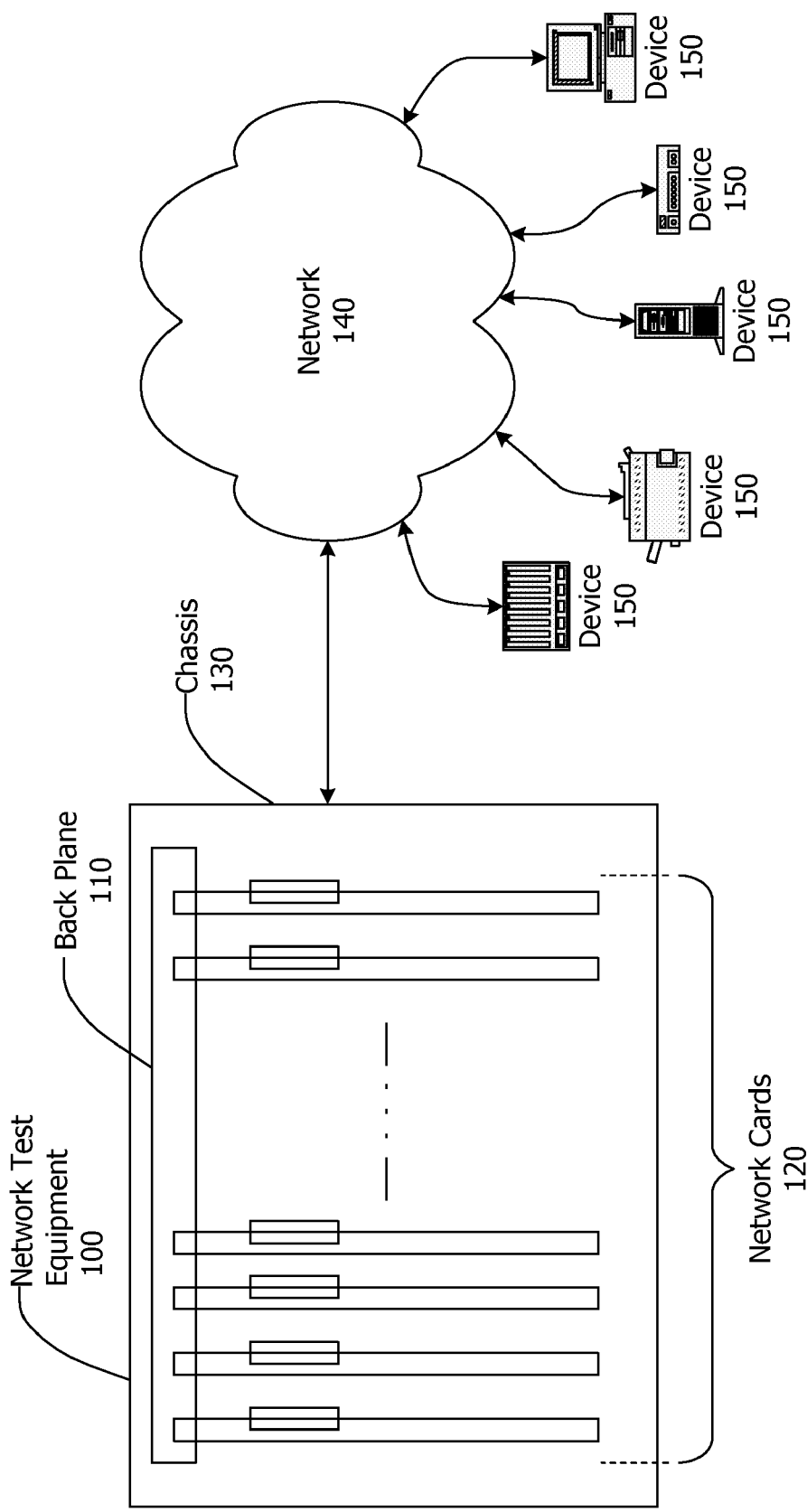
FIG. 1 is a block diagram of a network environment.

Referring now to FIG. 1, there is shown a block diagram of a network environment. The environment may include a network test equipment 100, a network 140 and plural network devices 150.

The network test equipment 100 may be a network testing device, performance analyzer, conformance validation system, network analyzer, or network management system. The network test equipment 100 may include one or more network cards 120 and a back plane 110 contained or enclosed within a chassis 130. The chassis 130 may be a fixed or portable chassis, cabinet, or enclosure suitable to contain a network test equipment. The network test equipment 100 may be in the form of a card rack, as shown in FIG. 1, or may be an integrated unit. Alternatively, the network test equipment 100 may comprise a number of separate units cooperative to provide traffic generation and/or analysis. The network test equipment 100 and the network cards 120 may support one or more well known standards or protocols such as the 10 Gigabit Ethernet and Fibre Channel standards, and may support proprietary protocols as well.

The network cards 120 may include one or more field programmable gate arrays (FPGA), application specific integrated circuits (ASIC), programmable logic devices (PLD), programmable logic arrays (PLA), processors and other kinds of devices. In addition, the network cards 120 may include software and firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed wiring boards. Each network card 120 may provide one or more network ports. The ports of the network cards 120 may be connected to the network through wire, optical fiber, wirelessly or otherwise. Each network card 120 may support a single communications protocol, may support a number of related protocols, or may support a number of unrelated protocols. The network cards 120 may be permanently installed in the network test equipment 100 or field removable. Each network card 120 may provide one or more ports.

The back plane 110 may serve as a bus or communications medium for the network cards 120. The back plane 110 may also provide power to the network cards 120.

The network devices 150 may be any devices capable of communicating over the network 140. The network devices 150 may be computing devices such as workstations, personal computers, servers, portable computers, personal digital assistants (PDAs), computing tablets, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, and multiplexers. In addition, the network devices 150 may include appliances such as refrigerators, washing machines, and the like as well as residential or commercial HVAC systems, alarm systems, and any other device or system capable of communicating over a network.

The network 140 may be a LAN, a WAN, a SAN, wired, wireless, or a combination of these, and may include or be the Internet. Communications on the network 140 may take various forms, including frames, cells, datagrams, packets or other units of information, all of which are referred to herein as packets. The network test equipment 100 and the network devices 150 may communicate simultaneously with one another, and there may be plural logical communications between the network test equipment 100 and a given network device 150. The network itself may be comprised of numerous nodes providing numerous physical and logical paths for data to travel.

A series of packets originating from a single source on the network having a specific type of packet and a specific rate will be referred to herein as a "stream." A source may support multiple outgoing and incoming streams simultaneously and concurrently, for example to accommodate multiple packet types or rates. A source may be, for example, a port on a network interface. "Simultaneously" means "at exactly the same time." "Concurrently" means "within the same time." A plurality of concurrent streams may be combined to form what will be referred to herein as a "flow". A single flow may represent a plurality of packet types. The streams within a flow share the data rate of the flow through interleaving. The interleaving may be balanced, unbalanced, and distributed among the represented streams. In modem "triple play" networks and network equipment, a flow may contain data, audio, and video streams.

Figure 2:
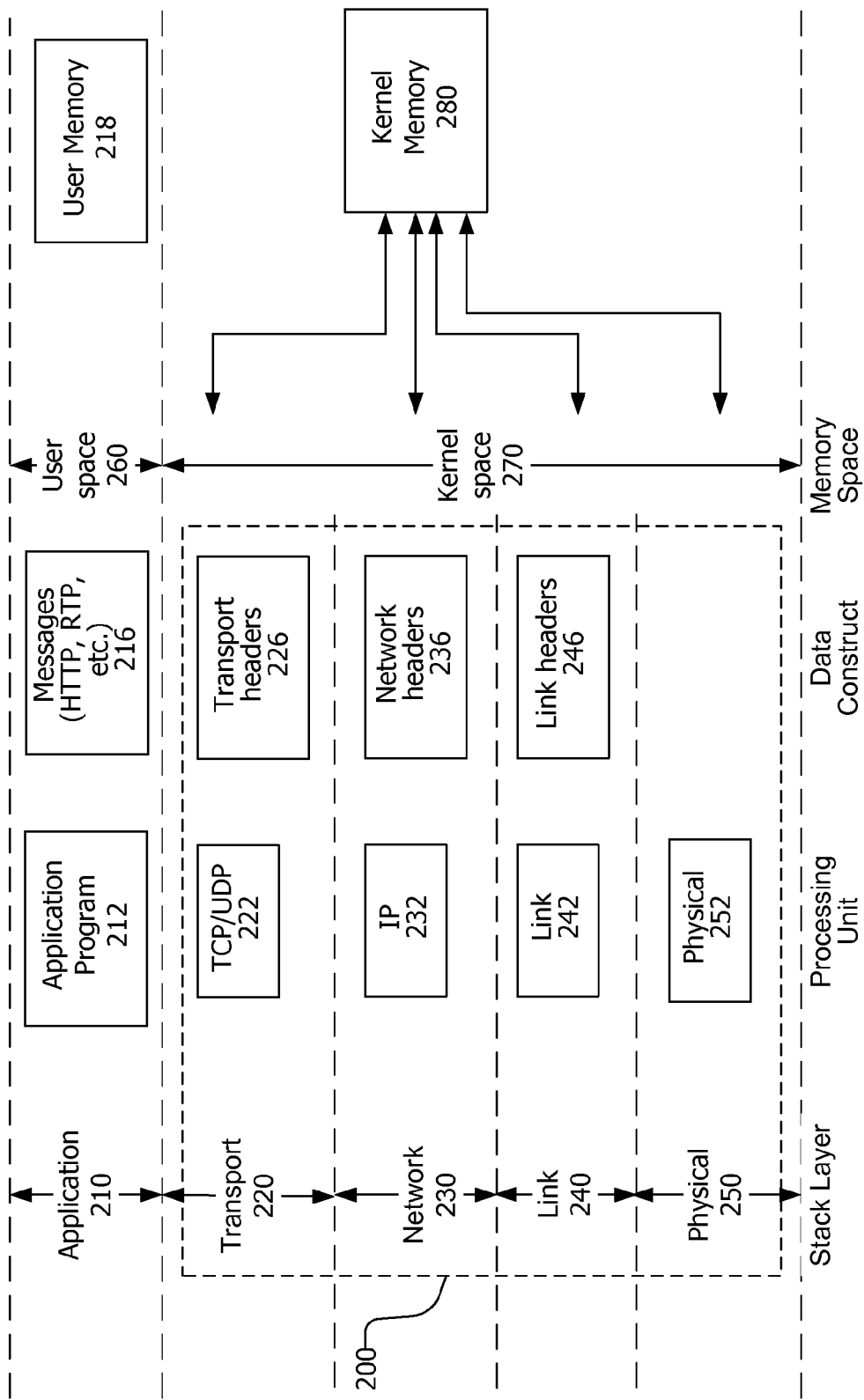
FIG. 2 is a diagram of a logical arrangement of a protocol stack in a communications apparatus.

Referring now to FIG. 2, there is shown a diagram of a logical arrangement in a communications apparatus. The communications apparatus may be logically divided into five layers 210, 220, 230, 240, 250, which in FIG. 2 are demarcated by dashed lines. The application layer 210 may be in user space 260. The other layers 220, 230, 240, 250 may be in kernel space 270.

Within kernel space 270 there may be a kernel memory 280 and a conventional TCP/IP or UDP/IP protocol stack 200, comprising the transport layer 220, the network layer 230, the link layer 240, and the physical layer 250.

Within the application layer 210, there may be an application program 212 and application data 216. The application program 212 may be a test manager, test executive, or other application.

The TCP/IP or UDP/IP protocol stack 200 may have the four layers described above: transport 220, network 230, link 240, and physical 250. The TCP/IP or UDP/IP protocol stack 200 may run entirely in kernel space 270. For each layer 220, 230, 240, 250 of the TCP/IP or UDP/IP protocol stack 200 there may be a corresponding processing unit 222, 232, 242, 252, memory constructs, and data constructs 226, 236, 246. The processing units may be implemented at least in part by software instructions executed by a common or separate processor. The software instructions may be stored on a computer readable storage medium.

Within the transport layer 220, there may be a transport unit 222. The transport unit 222 may form transport headers 226 for transmission and interprets received transport headers. In either the UDP or TCP transport layer protocols, the transport header may include a checksum.

Within the network layer 230, there may be a network unit 232. In a TCP/IP or UDP/IP protocol stack, the network protocol is IP. The network unit 232 may form and interpret network headers 236. In IP, the network header 236 may also include a checksum.

Within the link layer 240, there may be a link unit 242. The link layer may also include a transmit queue and a receive queue that are not shown in FIG. 2. The link unit 242 may form link headers 246 for transmission and interpret received link headers. Each link header may be an Ethernet MAC header, though other protocols may be used, such as ATM and Sonet.

The physical unit 252 may frame and transmit packets, and receive and de-frame packets. The physical unit 252 may be or have hardware for assembling packets. The physical unit 252 may also include hardware to perform packet processing operations including generating checksums and performing encryption as packets are transmitted.

Figure 3:
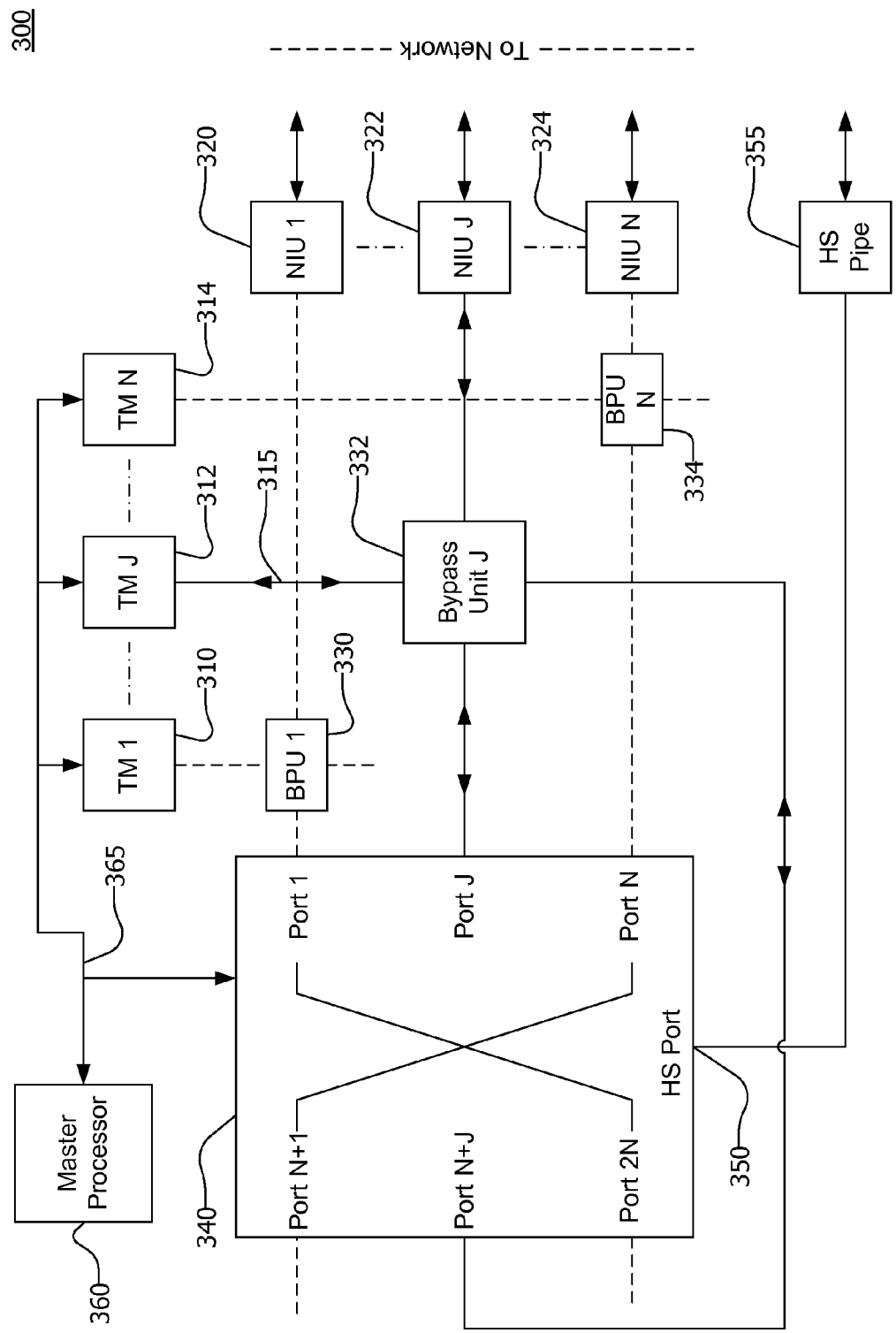
FIG. 3 is a block diagram of a reconfigurable test system.

Referring now to FIG. 3, there is shown a block diagram of an exemplary reconfigurable system 300 for testing a device. The device under test may be a network device as previously defined or may be a network subsystem consisting of a plurality of network devices connected by a network. The reconfigurable system 300 may include a 2N-port packet switch 340, N test modules (TM 1-N) 310-314, N network interface units (NIU 1-N) 320-314, and N bypass units (BPU 1-N) 330-334, where N is an integer number. N may be equal to 4, 8, 12, 16 or other integer. The reconfigurable system 300 may include a master processor 360.

The reconfigurable system 300 may be contained within a chassis, such as chassis 130 of FIG. 1. The reconfigurable system 300 may be contained on a network card, such as network cards 120 of FIG. 1.

Within this description, a "test module" includes any circuit, device, module, card, subsystem, or other means for generating and/or analyzing a packet stream for the purpose of testing a network or network device. Within this description, a "pipe" is a bidirectional path over which packet streams may travel on a first-in, first-out basis, without reordering.

The N test modules 310-314 may or may not be identical. A specific test module (i.e. 312) may be capable of generating and transmitting one or more streams of packets. A test module may be capable of receiving and analyzing one or more packet streams. A test module may be capable of generating, transmitting, receiving and analyzing packet streams.

Each test module 310-314 may have at least one bidirectional interface or port for transmitting and/or receiving packet streams. Within this description, the term "bidirectional" means that data traffic may flow in both directions through a port or along a path, but does not imply that the data flowing in opposite directions travels by means of the same physical connections or hardware.

Each of the test modules 310-314 may be associated with one of the bypass units (330-334). Within this description, the phrase "associated" means that a bidirectional data path exists between two units or modules by which they can send and receive packets to and from each other. Each bidirectional data path may be comprised of separate serial connections for each direction of communication or multiple connections by which bytes (8 bits), words (16 or 32 bits), or other amounts of data may be transmitted and received in parallel. Each bidirectional data path may operate in accordance with one or more industry standards including Gigabit Media Independent Interface (GMII), Reduced Gigabit Media Independent Interface (RGMII), Serial Gigabit Media Independent Interface (SGMII), System Packet Interface (SPI-4.2), Common Switch Interface (CSIX), RocketIO, or other standard. The bidirectional data paths between units or modules may not conform to any industry standard. Different standard or non-standard data transfer methods may be used between different pairs of units or modules. For example, the data paths between test modules 310-314 and bypass units 330-334 may conform to a first industry standard and the data paths between the bypass units 330-334 and the network interface units 320-324 may be non-standard or may conform to a second industry standard.

For example, in FIG. 3, test module J 312 is associated with bypass unit J 332 by virtue of data path 315. The data path between test module J 312 and bypass unit J 332 is unique in that test module J 312 does not have a data path to any other bypass unit, and bypass unit J does not have a data path to any other test module. Test module J 312 is not associated with any other bypass units (i.e. 330 or 334), since test module J does not have a data path to other bypass units. Similarly, bypass unit J 332 is associated with network interface unit J 322 and switch port J and switch port N+J by virtue of having data paths to network interface unit J 322 and switch ports J and N+J. The test modules, network interface units, bypass units and switch ports in the example of FIG. 2 have been numbered in a logical manner to facilitate description of the reconfigurable test system 300. It should be noted that the numbering of the various components is arbitrary and many other naming and numbering schemes are possible.

The system 300 may have communication paths in addition to the data paths between associated test modules, bypass units, network interface units, and switch ports. These additional communication paths may connect any or all of the test modules, bypass units, and network interface units. The additional communication paths may be used to communicate control information and other data.

Each of the N test modules 310-314 may include hardware, firmware, and software to enable the test module to perform the functions of generating packets for transmission and/or analyzing received packets. Analyzing received packets may include processing operation such as extracting the packet header information; determining if the packet was transmitted and received correctly; determining if any expected packets are lost or have not been received; compiling performance statistics such as the number of packets sent, the number of packets lost, and the number of packets damaged; and making and compiling temporal measurements such as network latency and device response time.

Each of the N test modules 310-314 may include one or more field programmable gate arrays (FPGA), application specific integrated circuits (ASIC), programmable logic devices (PLD), programmable logic arrays (PLA), processors, memories, and other kinds of devices. A single FPGA, ASIC, PLD or PLA may contain all or portions of a plurality of test modules. A specific test module (312) may implement a protocol stack, or a portion of a protocol stack, as previously described in conjunction with FIG. 2. The test module 312 may implement the protocol stack, or portion thereof, in a combination of software, hardware, and firmware. Each test module 310-314 may be all or a portion of a line card as described in conjunction with FIG. 1.

Each of the N network interface units 320-324 may have a first end in communication with an associated one of the bypass units (330-334). Each of the N network interface units 320-324 may have a second end adapted to interface with a network. Each network interface unit may include circuitry to convert data to be transmitted from the format used on the internal data path between the network interface unit and the associated bypass unit to the data format used for communication on the network. Each network interface unit may include circuitry to perform encoding such as Manchester encoding, 8-bit to 10-bit encoding or 64-bit to 66-bit encoding; circuitry to convert internal signal levels to the electrical or optical signal levels required for communication over a network; and circuitry to perform other packet and signal processing operations that may include encryption or decryption, addition of timestamps, queuing, scheduling and jitter control, checksum calculation or verification, and other processing. Each network interface unit may include circuitry to receive the electrical or optical signals used for communication over a network, to decode encoded data, to convert the network data format into parallel format, and to perform other packet and signal processing operations.

The N network interface units 320-324 may or may not be identical. Each of the N network interface units 320-324 may include one or more first-in-first-out buffer memories in addition to one or more field programmable gate arrays (FPGA), application specific integrated circuits (ASIC), programmable logic devices (PLD), programmable logic arrays (PLA), and other kinds of devices. A single FPGA, ASIC, PLD or PLA may contain all or portions of a plurality of network interface units. In addition, each network interface unit 320-324 may include firmware and may be initialized under software control. A specific network interface unit (322) may implement a protocol stack, or a portion of a protocol stack, as previously described in conjunction with FIG. 2. The network interface unit may implement a protocol stack, or portion thereof, in a combination of software, hardware, and firmware. Each network interface unit 320-324 may be all or a portion of a line card as described in conjunction with FIG. 1.

Each of the N bypass units 330-334 may have data paths to an associated test module, the first end of an associated network interface unit, a first associated switch port and a second associated switch port. For example, as shown in FIG. 3, bypass unit J 332 is associated with test module J 312, the first end of network interface unit J 322, switch port J and switch port N+J. It must be understood that similar data paths may exist between the other bypass units and their associated test modules, network interface units, and switch ports. These other data paths are not shown in FIG. 3 but are implied by dashed lines.

Figure 4A:
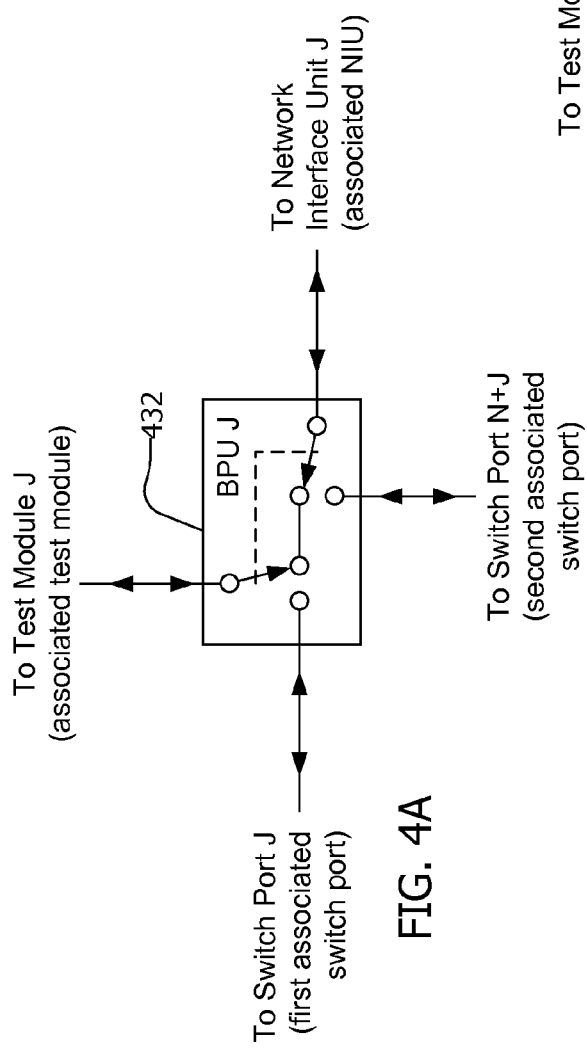
FIG. 4A is a block diagram of a first mode of a bypass unit.
Figure 4B:
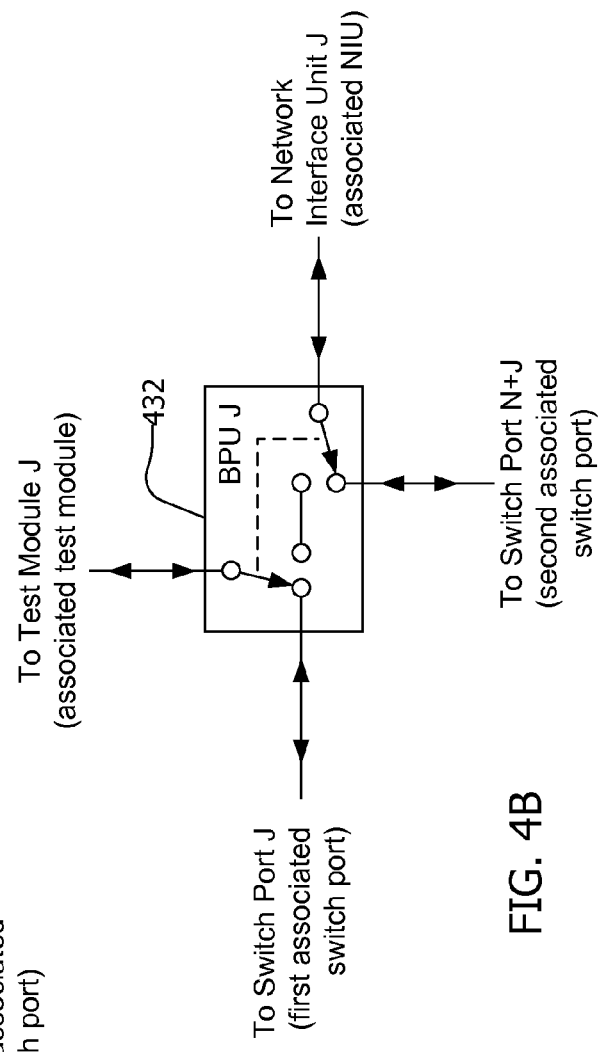
FIG. 4B is a block diagram of a second mode of a bypass unit.

Referring now to FIG. 4A and FIG. 4B, each bypass unit may have at least a first mode and a second mode. FIG. 4A and FIG. 4B illustrate the operation of bypass unit J 432, but are representative of the operation of each bypass unit. In the first mode, as shown in FIG. 4A, bypass unit J 432 may place test module J in direct communication with the first end of network interface unit J, and switch ports J and N+J may be unused. "Direct communication" means that test module J and network interface unit J are in communication along a data path that does not pass through the switch ports. In the second mode, as shown in FIG. 4B, bypass unit J 432 may place test module J in communication with switch port J, and may place the first end of network interface unit J in communication with switch port N+J. Thus bypass unit J 432, and each of the other bypass units, may include the functionality of a double-pole double-throw switch.

Returning now to FIG. 3, each bypass unit 430-434 may include additional functionality. For example, the communication path between test modules 310-314 and bypass units 330-334 may conform to a first industry standard and the communication path between the bypass units 330-334 and the network interface units 320-324 may be non-standard or may conform to a second industry standard. In this example, the bypass units would perform the necessary conversion between the different signal paths.

Each of the N bypass units 330-334 may include one or more first-in-first-out buffer memories in addition to one or more field programmable gate arrays (FPGA), application specific integrated circuits (ASIC), programmable logic devices (PLD), programmable logic arrays (PLA), and other kinds of devices. A single FPGA, ASIC, PLD or PLA may contain all or portions of a plurality bypass units. In addition, each bypass unit 330-334 may include firmware and may be initialized under software control. Each bypass unit 330-334 may be all or a portion of a line card as described in conjunction with FIG. 1.

The number of test modules and network interface units may be unequal. For example, a reconfigurable test system many have N test modules and M network interface units, in which case the switch may have N+M ports. Additionally, a reconfigurable test system may not have a bypass unit associated with each test module or network interface unit. A reconfigurable test system including N test modules and M network interface units may have no bypass units, one bypass unit, or P bypass units, where P is not greater than the smaller of N and M.

The packet switch 340 may be capable of switching packets received at any one of the 2N switch ports to any other of the 2N switch ports. The packet switch 340 may include a switch table, which may also be called a routing table or address table, that lists the physical and/or logical addresses that are connected to each switch port. The switch table may include other information, such as packet type or quality of service requirements, that may also be used to determine a destination switch port for each received packet. The packet switch 340 may interpret the header or other content of each received packet to determine a physical and/or logical destination address and other information for the packet. The packet switch 340 may then compare the destination address and other information of the received packet with the data in the switch table to determine the appropriate port to which to switch the packet.

The switch table within the packet switch 340 may be populated, at least in part, by instructions received from the master processor 360 at the start of, or during, a test session. The packet switch 340 may populate the switch table, at least in part, by interpreting the source physical and/or logical address and other information within each arriving packet. For example, a packet from a previously unknown source address that arrives at one of the 2N switch may cause the packet switch to add the previously unknown source address, along with the port number, to the switch table.

The packet switch 340 may receive packets having destination addresses that are unknown or not included in the switch table. The packet switch 340 may dispose of packets having unknown destination addresses in accordance with some rule. Possible rules include deleting all packets with unknown destination addresses, switching all packets with unknown destination addresses to a specific switch port, or multicasting packets with unknown destination addresses to a predetermined plurality of switch ports or all switch ports. The specific rule to be used may be defined by instructions provided by the master processor 360.

The packet switch 340 may include buffer memories and flow control logic that allows packets received on two or more switch ports to be switched to a single selected switch port. The packets received from the two or more switch ports may be aggregated into a single packet flow that exits the packet switch 340 from the selected switch port. The packet switch 340 may also de-aggregate packets received at a single switch port into multiple packet streams that exit the switch at two or more switch ports. Within this description, "aggregated" means that packets are time time-multiplexed or interleaved into a single packet flow, and "de-aggregated" means that a single flow of packets is demultiplexed into multiple packet streams.

The 2N switch ports of packet switch 340 may be adapted to operate at a data rate up to a first maximum data rate. The 2N test modules 310-3143, the 2N network interface units 320-324, and the 2N bypass modules 330-334 may also be adapted to operate at a data rate up to the first maximum data rate. The 2N test modules 310-3143, the 2N network interface units 320-324, and the 2N bypass modules 330-334 may not operate at the same data rate. The data rates between the switch, the test modules, the network interface units, and the 2N bypass modules may be different from each other and may be different from the hardware clock rate.

The packet switch 340 may include at least one high speed port 350. The high speed port 350 may be adapted to operate at data rates up to a second maximum data rate substantially higher than the first maximum data rate. The second maximum data rate may be at least twice the first maximum data rate. The second maximum data rate may be ten times the first maximum data rate or higher. For example, the first maximum data rate may be 1 Gigabit per second (Gbps) and the second maximum data rate may be 10 Gbps.

The packet switch 340 may be capable of aggregating packets received at rates up to the first maximum data rate at a plurality of the 2N switch ports into a single packet flow that exits the packet switch 340 at high speed port 350 at a data rate up to the second maximum data rate. Conversely, the packet switch 340 may be capable of de-aggregating a packet flow received at the high speed port 350 into a plurality of packet streams that exit the packet switch 340 at a plurality of the 2N switch ports.

The reconfigurable test system 300 may include at least one high speed pipe 355 adapted to operate at a data rate up to the second maximum data rate. The high speed pipe 355 may have a first end in communication with the high speed port 350 of packet switch 340, and a second end adapted to interface with a network.

Figure 5:
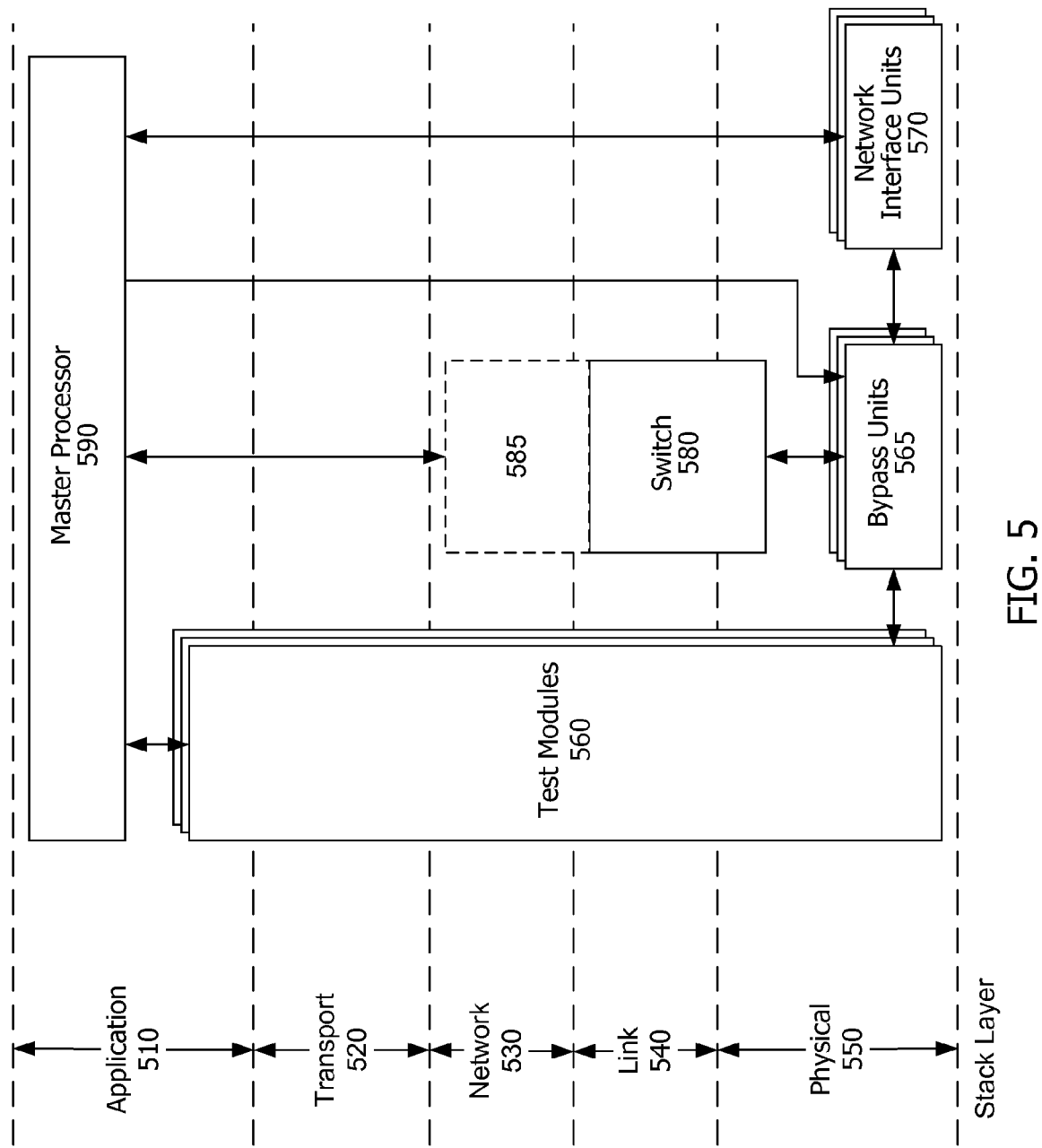
FIG. 5 is a diagram of a logical arrangement for a reconfigurable test system.

FIG. 5 is a diagram of an exemplary logical arrangement for a reconfigurable test system such as the reconfigurable test system 300 of FIG. 3. The reconfigurable test system may be logically divided into five layers 510, 520, 530, 540, and 550, which are demarcated by dashed lines. The five layers comprise an application layer 510, a transport layer 520, a network layer 530, a link layer 540, and a physical layer 550. The function of each of these layers was previously described in conjunction with FIG. 2.

A plurality of test modules 560 may span all five levels of the logic arrangement. Each of the plurality of test modules may contain all or part of the functionality of a protocol stack as described in conjunction with FIG. 2. A plurality of bypass units 565 and a plurality of network interface units 570 may operate within the physical layer.

A packet switch 580 may operate within the physical and link layers, or may operate within the physical, link, and network layers as indicated by the expanded switch 585. When operating within the link layer, the packet switch 580 may extract address information, such as MAC addresses, from the link header of packets that arrive at the ports of the packet switch 580. When operating within the network layer, the packet switch 580 may extract logical address information, such as IP addresses, from the IP header of arriving packets.

A master processor 590 may operate primarily within the application layer. The master processor 590 may execute one or more application programs which may include a test executive or test manager application. The master processor 590 may provide instructions and initialization data to the packets switch 580 and to the pluralities of test modules 560, bypass units 565, and network interface units 570 before and during test sessions. The master processor may also receive data, in particular from the test modules, during test sessions. The master processor may accumulate test statistics from the received data. The master processor may have other functions not directly related to the performance of test sessions and may include a full protocol stack to interface to a network independent of the test modules, bypass units and network interface units of the reconfigurable test system.

Figure 6:
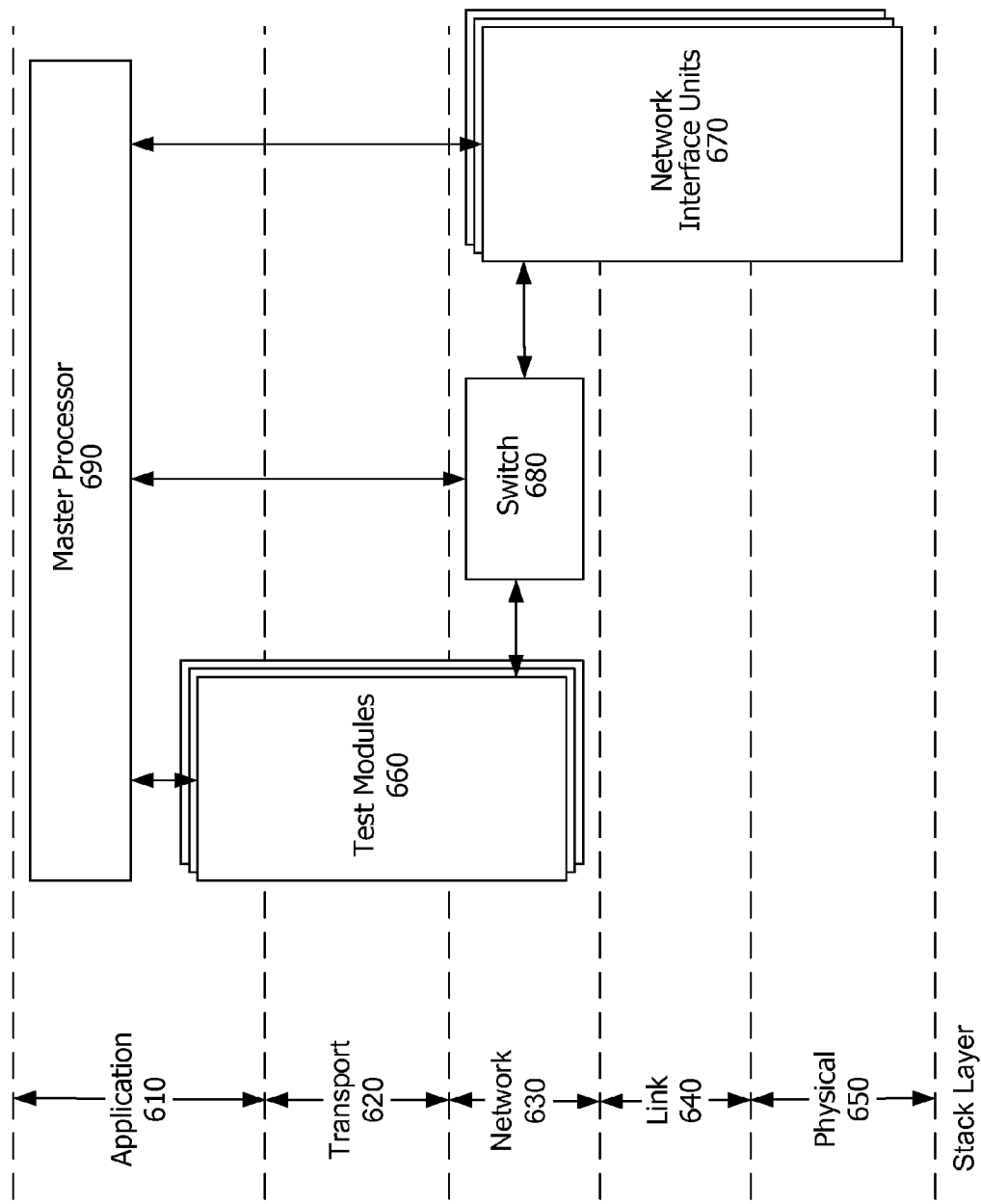
FIG. 6 is a diagram of a logical arrangement for a reconfigurable test system.

FIG. 6 is a diagram of another exemplary logical arrangement for a reconfigurable test system such as the reconfigurable test system 300 of FIG. 3. The reconfigurable test system may be logically divided into five layers 610, 620, 630, 640, and 650, which are demarcated by dashed lines. The five layers comprise an application layer 510, a transport layer 520, a network layer 530, a link layer 540, and a physical layer 550. The function of each of these layers was previously described in conjunction with FIG. 2.

A plurality of test modules 660 may span the application 610, transport 620, and network 630 levels of the logical arrangement. Each of the plurality of test modules may contain part of the functionality of the transport and network levels of a protocol stack as described in conjunction with FIG. 2.

A plurality of network interface units 670 may span the network 630, link 640, and physical 650 levels of the logical arrangement. Each of the plurality of network interface units may contain part of the functionality of the network, link, and physical levels of a protocol stack as described in conjunction with FIG. 2.

A packet switch 680 may operate within the network layer 630. When operating within the network layer, the packet switch 580 may extract address information, such as IP addresses, from the network header of packets that arrive at the ports of the packet switch 680.

A master processor 590 may operate primarily within the application layer. The master processor 590 may operate as previously described in conjunction with FIG. 5.

The logical arrangements of FIG. 5 and FIG. 6 are examples, and other logical arrangements maybe used. For further example, the switch 680 of FIG. 6 could operate at the link level or both the link and network levels. A reconfigurable test system such as the reconfigurable test system 300 of FIG. 3 may be adapted to accommodate multiple logical arrangements.

Description of Processes

Referring now to FIG. 7A-7C, various methods of using a reconfigurable test system will be described. These methods of operation are consistent with the reconfigurable test system 300 of FIG. 3, but are compatible with other test systems.

FIG. 7A is a flow chart of a method of operating a reconfigurable test system having N test modules and M network interface units. A test module J, which can be any of the N test modules, may be in communication with a dedicated network interface unit K, which can be any of the M network interface units. Test module J may generate and/or analyze packets at 710. The packets generated and/or analyzed by test module J may be transmitted over a network and/or received from a network by network interface unit K at 720. In a system such as reconfigurable test system 300 of FIG. 3, test module J may be in communication with network interface unit K via a corresponding bypass module without going through a switch. In this case, J=K. Alternatively, test module J may be in communication with network interface unit K by means of a switch, in which case J and K can be selected independently.

FIG. 7B is a flow chart of a another method of operating a reconfigurable test system having N test modules, M network interface units, and a switch. The switch may have M+N ports. At 730, two or more test modules, which can be any of the N test modules, may modules, may generate and/or analyze packets. The packets generated at 730 are aggregated, or interleaved, into a single packet flow by the switch at 740. The aggregated packet flow is transmitted over a network by a selected network interface unit, which can be any of the M network interface units, at 750. The selected network interface unit may receive a packet flow at 750, and the received packet flow may be de-aggregated into multiple packet streams by the switch at 740. The de-aggregated packet streams may be analyzed by two or more test modules at 730. The method of operation of FIG. 7B may be useful when a single test module cannot fill the capacity of a network interface unit due to the processing time needed to generate a complex packet stream.

FIG. 7C is a flow chart of a another method of operating a reconfigurable test system having N test modules, at least one high speed pipe, and a switch having at least one high speed port. At 760, a plurality of test modules, which can be any or all of the N test modules, may generate and/or analyze packets. The packets generated at 760 may be aggregated, or interleaved, into a single high speed packet flow by the switch at 770. The high speed port of the switch may be in communication with the high speed pipe. The aggregated high speed packet flow may be transmitted over a network by the high speed pipe at 780. The high speed pipe may receive a packet flow at 780, and the received high speed packet flow may be de-aggregated into multiple packet streams by the switch at 770. The de-aggregated packet streams may be analyzed by the plurality of test modules at 760. The method of operation of FIG. 7C may be useful when a plurality of lower-speed test modules are required to fill the capacity of the high speed pipe.

The methods of operation of FIGS. 7A-7C may not be the only methods of operating a reconfigurable test system such as the reconfigurable test system 300 of FIG. 3. Additionally, the methods of operation of FIGS. 7A-7C may be used simultaneously within a reconfigurable test system. For example, assume a reconfigurable test system with 12 test modules, 12 network interface units, 12 bypass units and a 24-port switch. Three test modules may be aggregated into a first network interface unit as shown in FIG. 7B. Six more test modules may be aggregated into a high speed pipe as shown in FIG. 7C. The remaining three test modules may be in direct communication with three dedicated network interface units as shown in FIG. 7A.

Closing Comments

The foregoing is merely illustrative and not limiting, having been presented by way of example only. Although examples have been shown and described, it will be apparent to those having ordinary skill in the art that changes, modifications, and/or alterations may be made.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A reconfigurable network card for a network test system, comprising:
   a packet switch having 2N switch ports, where N is an integer number greater than 1;
   N test modules;
   N network interface units, each having a first end and a second end, the second end adapted to be connected to a network; and
   N bypass units, each bypass unit uniquely associated with one of the N test modules, one of the N network interface units, and two switch ports of the 2N switch ports of the packet switch, each bypass unit coupled to each of the associated test module, the first end of the associated network interface unit, and the two associated switch ports by respective data paths;
   wherein each bypass unit has a first mode wherein the associated test module is placed in direct communication with the first end of the associated network interface unit, and a second mode wherein the associated test module is placed in communication with one of the two associated switch ports and the associated network interface unit is placed in communication with the other of the two associated switch ports.

2. The reconfigurable network card of claim 1, wherein the packet switch is adapted to switch packets received at any one of the 2N switch ports to any other of the 2N switch ports.

3. The reconfigurable network card of claim 1, wherein
the 2N switch ports, the N test modules, the N network interface units, and the N bypass units are adapted to operate at data rates up to a first maximum data rate, and
the switch further includes a high speed port adapted to operate at data rates up to a second maximum data rate higher than the first maximum data rate.

4. The reconfigurable network card of claim 3, wherein the switch is adapted to aggregate packets from at least some of the 2N switch ports to the high speed port and to de-aggregate packets from the high speed port to at least some of the 2N switch ports.

5. The reconfigurable network card of claim 3, further comprising a high speed pipe to interface the high speed port to a network.

6. The reconfigurable network card of claim 3, wherein the first maximum data rate is 1 Gbps and the second maximum data rate is 10 Gbps.

7. The reconfigurable network card of claim 1, wherein the packet switch further comprises:
logic to interpret a header within each packet that arrives at any of the 2N switch ports to determine a destination address for each arriving packet, and
a switch table that lists the destination addresses that are connected to each of the 2N switch ports.

8. The reconfigurable network card claim 7, wherein the switch table is populated, at least in part, by instructions received from a master processor before or during a test session.

9. The reconfigurable network card claim 7, wherein the switch table is populated, at least in part, by interpreting the source address within the header of each arriving packet.

10. A reconfigurable network card for a network test system, comprising:
a packet switch having M+N switch ports, wherein M and N are integer numbers greater than 1;
N test modules;
M network interface units, each having a first end and a second end, the second end adapted to be connected to a network; and
P bypass units, wherein
P is an integer no greater than the smaller of M and N,
each bypass unit uniquely associated with a corresponding one of the N test module, a corresponding one of the M network interface units, and two switch ports of the M+N switch ports, each bypass unit coupled to each of the associate test module, the first end of the associated network interface unit, and the two associated switch ports by respective data paths, and
each bypass unit has a first mode wherein the associated test module is placed in direct communication with the first end of the associated network interface unit, and a second mode wherein the associated test module is placed in communication with one of the associated switch ports and the associated network interface unit is placed in communication with the other associated switch port.

11. The reconfigurable network card of claim 10, wherein
the N+M switch ports, the N test modules, the M network interface units, and the P bypass units are adapted to operate at data rates up to a first maximum data rate, and
the switch further includes a high speed port adapted to operate at data rates up to a second maximum data rate higher than the first maximum data rate.

12. The reconfigurable network card of claim 11, wherein the switch is adapted to aggregate packets from at least some of the M+N switch ports to the high speed port and to de-aggregate packets from the high speed port to at least some of the M+N switch ports.

13. The reconfigurable network card of claim 11, further comprising a high speed pipe to interface the high speed port to a network.

14. The reconfigurable network card of claim 11, wherein the first maximum data rate is 1 Gbps and the second maximum data rate is 10 Gbps.

* * * * *

UNITED STATES PATENT AND TRADEMARK OFFICE
CERTIFICATE OF CORRECTION

| | | |
|---|---|---|
| PATENT NO. | : 7,925,793 B2 | Page 1 of 1 |
| APPLICATION NO. | : 11/756470 | |
| DATED | : April 12, 2011 | |
| INVENTOR(S) | : Rittmeyer et al. | |

It is certified that error appears in the above-identified patent and that said Letters Patent is hereby corrected as shown below:

Column 4, line 53: replace --modem-- with "modern".

Column 11, line 28: delete "may modules".

Signed and Sealed this

Thirty-first Day of May, 2011

David J. Kappos
*Director of the United States Patent and Trademark Office*